United States Patent [19]

Coleman et al.

[11] 4,118,933
[45] Oct. 10, 1978

[54] BEARING LOAD INDICATOR

[75] Inventors: William H. Coleman, Marple; Francis S. Maszk, Westtown Township, Allegheny County, both of Pa.

[73] Assignee: Westinghouse Electric Corp., Pittsburgh, Pa.

[21] Appl. No.: 804,428

[22] Filed: Jun. 7, 1977

[51] Int. Cl.² ............................................ G01M 13/04
[52] U.S. Cl. ........................................ 73/766; 73/462; 73/767
[58] Field of Search ................... 73/88.5 R, 118, 140, 73/143

[56] References Cited

U.S. PATENT DOCUMENTS

| | | | |
|---|---|---|---|
| 2,623,384 | 12/1952 | Pigott | 73/88.5 R X |
| 2,704,452 | 3/1955 | Federn | 73/88.5 |
| 3,260,106 | 7/1966 | Hull et al. | 73/88.5 R X |
| 3,280,623 | 10/1966 | Saxl | 73/88.5 R X |
| 3,330,154 | 7/1967 | Habern et al. | 73/88.5 R X |

Primary Examiner—Jerry W. Myracle
Attorney, Agent, or Firm—F. J. Baehr, Jr.

[57] ABSTRACT

Pairs of strain gauges are symmetrically disposed on a bearing support structure and feed signals to indicating and/or recording devices to indicate bearing load conditions.

6 Claims, 3 Drawing Figures

BEARING LOAD INDICATOR

BACKGROUND OF THE INVENTION

This invention relates to apparatus for sensing, indicating, and/or recording loading on a bearing and/or particularly to such apparatus incorporating strain gauges.

Turbo-generators due to the mass of their rotors and the space between supports are rotatably supported by a series of journal bearings initially aligned on an analytically determined curve. Misalignment or other load producing malfunctions may damage the bearing surfaces and result in forced outages and costly repairs. The potential effects of such malfunctions increase as the size of the turbo-generator increases and the propensity for such failures may be augmented by the proposed use of steel foundations, particularly if the turbo-generator is mounted on a barge located at an offshore ocean or lake site. Therefore, early and continuous indication of bearing loads will assist insuring long-term reliability of large turbo-generator units and other large rotating apparatus.

SUMMARY OF THE INVENTION

In general, a bearing load indicator for determining the load on a bearing utilizing strain in predetermined portions of the bearing support yoke, when made in accordance with this invention, comprises a plurality of strain gauges disposed on one side of said bearing support yoke, a plurality of strain gauges disposed on the other side of the bearing support yoke and means for comparing the changes in strain sensitive parameter of the strain gauges and for producing a signal indicative of the load on the bearing.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
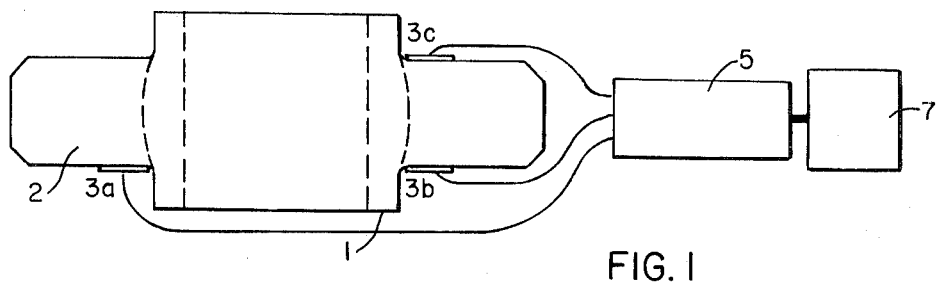
FIG. 1 is a plan view of a bearing, its supporting yoke and a bearing load indicator made in accordance with this invention.
Figure 2:
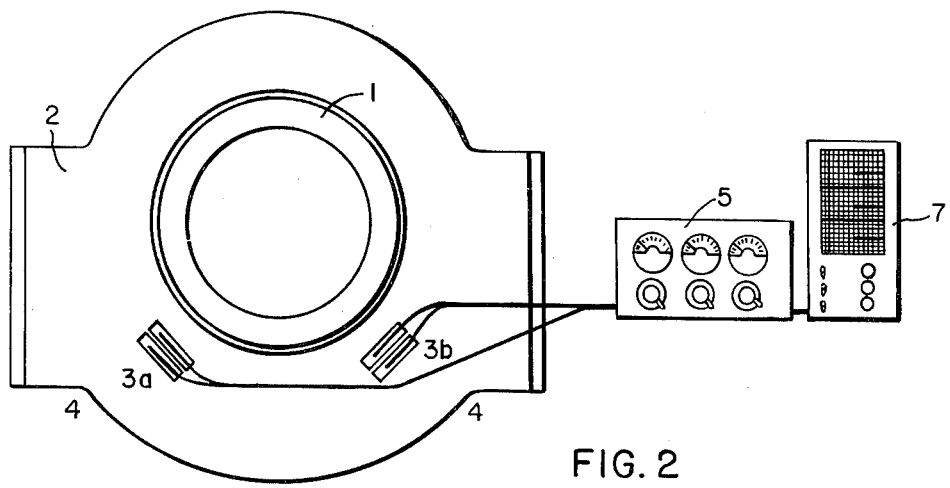
FIG. 2 is an end elevation view of a bearing, its supporting yoke and bearing load indicator made in accordance with this invention.

Referring now to the drawings in more detail, FIGS. 1 and 2 show a bearing shell 1 and its support yoke 2 of a turbo-generator unit or other rotating apparatus. Symmetrically disposed on the lower half of the bearing yoke 2 are a plurality of strain gauges 3a, 3b, 3c, arranged in pairs. A pair of strain gauges 3b on one side of the bearing yoke 2 are disposed opposite a pair of strain gauges 3c on the other side of the bearing yoke 2. The strain gauges are so disposed as to be aligned in an axial direction.

One side of the bearing yoke 2 has two pair of strain gauges 3a, 3b disposed in a plane generally normal to the rotational axis of the bearing. Each pair is symmetrically disposed with respect to the rotational axis of the bearing and is generally disposed below and radially outwardly from the rotational axis of the bearing to the extent that all strain gauges 3a, 3b, 3c are located in the proximity of bearing yoke notches, 4.

The strain gauges are mounted in pairs and one strain gauge in each pair is mounted so as not to respond to the strain, but serves as a temperature compensator. That is, one of the strain gauges in each pair is not completely affixed to the yoke 2, but is attached thereto so as to be subjected solely to the temperature at that location while the other strain gauge is normally affixed to the yoke 2, and is subjected to both load on the yoke and temperature. The strain as well as changes in temperature change the resistance of the strain gauges 3a, 3b, 3c and from this change in resistance a signal proportional to the strain is fed to a strain indicator 5 which may be calibrated to indicate load as strain is proportional to the load on the bearing. The signal may also be fed to a continuous recording strain indicator 7, calibrated to record and indicate the load at each pair of strain gauges.

Figure 3:
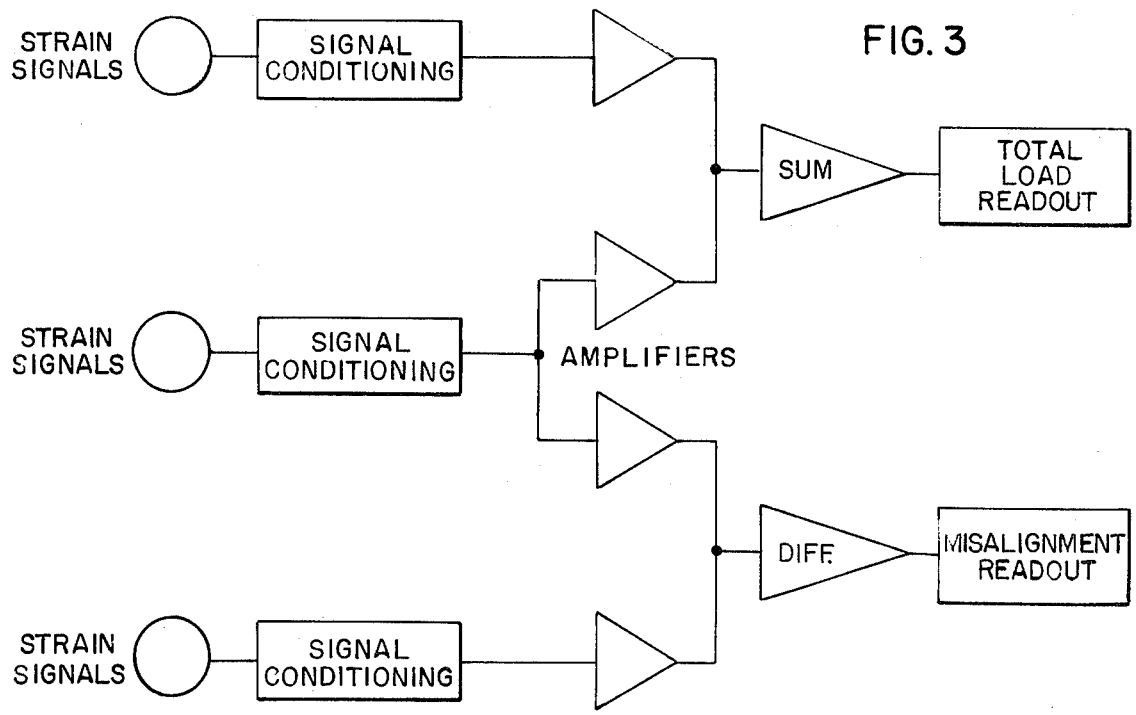
FIG. 3 is a logical schematic utilized to produce the various load indications.

The indicator 5 or recorder 7 may also include circuitry, the logic of which is schematically represented in FIG. 3 and which compares the signal from certain pairs of strain gauges to indicate the characteristic of specific loads on the yoke. For example, if the indicator 5 and recorder 7 compare the two pair of strain gauges 3a, 3b disposed symmetrically in a transverse plane normal to the axis of the bearing, a bearing reaction load is indicated. The use of these two locations eliminates the affect of frictional torque within the bearing so that the reaction load is indicated directly. If the indicator 5 or recorder 7 compares the signal from the strain gauges 3b, 3c disposed on opposite sides of the bearing and aligned in axial direction, the results would indicate the misalignment moment on the bearing.

The indication produced by the apparatus hereinbefore described advantageously gives the loading on the bearing and indicates misalignment so that corrective action may be taken to correct alignment and abnormal loads in order to prevent overloading of the bearing and subsequent failures thereof.

What is claimed is:

1. A bearing load indicator for determining the load on a bearing utilizing the strain on a predetermined portion of a bearing support yoke, said bearing load indicator comprising a plurality of strain gauges disposed on one side of the bearing support yoke, a plurality of strain gauges disposed on the other side of the bearing support yoke, the plurality of strain gauges on one side of the bearing being generally disposed in a plane transverse to the rotational axis of said bearing and generally coplanar with the plurality of strain gauges on the other side of the bearing, and means for comparing the change in resistance of said strain gauges and for producing a signal indicative of the reactive load on the bearing and eliminating the effect of frictional torque on the bearing.

2. The bearing load indicator as set forth in claim 1, wherein the strain gauges are mounted in pairs and in each pair one strain gauge does not respond to the strain, but serves as a temperature compensator.

3. The bearing indicator as set forth in claim 1, wherein the plurality of strain gauges on one side of the bearing comprises two pair of strain gauges symmetrically disposed on opposite sides of the rotational axis of the bearing.

4. A bearing load indicator for determining the load on a bearing utilizing the strain on a predetermined portion of a bearing support yoke, said bearing load indicator comprising a plurality of strain gauges disposed on one side of the bearing support yoke, a plurality of strain gauges disposed on the other side of the bearing support yoke, the plurality of strain gauges on one side of the bearing being disposed in an axial direction with the plurality of strain gauges on the other side of the bearing, and means for comparing the change in resistance of said strain gauges and for producing a signal indicative of the misalignment moment imposed on the bearing.

5. The bearing load indicator as set forth in claim 4, wherein the strain gauges are mounted in pairs and in each pair one strain gauge does not respond to the strain, but serves as a temperature compensator.

6. The bearing indicator as set forth in claim 4, wherein the plurality of strain gauges on one side of the bearing comprises two pair of strain gauges symmetrically disposed on opposite sides of the rotational axis of the bearing.

* * * * *